(12) United States Patent
Chiou et al.

(10) Patent No.: US 8,478,368 B2
(45) Date of Patent: Jul. 2, 2013

(54) PORTABLE ELECTRONIC DEVICE

(75) Inventors: Chang-Hwang Chiou, Taoyuan (TW);
Ching-Shih Chen, Taoyuan (TW);
Yun-Long Tun, Taoyuan (TW)

(73) Assignee: HTC Corporation, Taoyuan, Taoyuan County (TW)

( * ) Notice: Subject to any disclaimer, the term of this patent is extended or adjusted under 35 U.S.C. 154(b) by 1019 days.

(21) Appl. No.: 12/120,259

(22) Filed: May 14, 2008

(65) Prior Publication Data
US 2009/0036179 A1 Feb. 5, 2009

(30) Foreign Application Priority Data
Jul. 30, 2007 (TW) .............................. 96127847 A

(51) Int. Cl.
*H04M 1/00* (2006.01)
(52) U.S. Cl.
USPC ................ 455/575.4; 455/575.1; 248/349.1; 248/292.14; 248/296.1; 16/221; 16/239; 16/333; 16/345; 16/352; 70/283.1
(58) Field of Classification Search
USPC ............ 455/575.4, 575.1; 248/349.1, 292.14, 248/296.1; 16/221, 239, 333, 345, 352
See application file for complete search history.

(56) References Cited

U.S. PATENT DOCUMENTS

| | | | |
|---|---|---|---|
| 6,149,442 A | 11/2000 | Enright | |
| 7,159,833 B2* | 1/2007 | Kato | 248/349.1 |
| 7,376,450 B2 | 5/2008 | Chen | |
| 7,529,571 B2* | 5/2009 | Byun et al. | 455/575.4 |
| 7,577,466 B2 | 8/2009 | Kim | |
| 2005/0125570 A1 | 6/2005 | Olodort et al. | |
| 2006/0046797 A1* | 3/2006 | Chen | 455/575.4 |
| 2007/0115255 A1* | 5/2007 | Pan | 345/156 |
| 2007/0167197 A1 | 7/2007 | Fuke et al. | |

FOREIGN PATENT DOCUMENTS

| | | |
|---|---|---|
| CN | 2372839 | 4/2000 |
| CN | 1291398 | 4/2001 |
| CN | 1988556 | 6/2007 |
| GB | 2 334 301 | 8/1999 |
| JP | 2001-142851 | 5/2001 |
| TW | 270628 | 7/2005 |
| TW | I254199 | 5/2006 |
| TW | M302207 | 12/2006 |
| TW | I278216 | 4/2007 |

OTHER PUBLICATIONS

English language translation of abstract of JP 2001-142851 (published May 25, 2001).
English language translation of abstract of TW 270628 (published Jul. 11, 2005).

(Continued)

*Primary Examiner* — Wayne Cai
*Assistant Examiner* — Chuck Huynh
(74) *Attorney, Agent, or Firm* — McClure, Qualey & Rodack, LLP

(57) ABSTRACT

A portable electronic device includes a main body, a cap body and a hinge assembly. The cap body is movably attached to the main body, and the hinge assembly is disposed between the main body and the cap body. The hinge assembly includes a sliding portion and a rotating portion connected to each other. When the cap body and the main body are totally overlapped, the cap body is selectively to rotate or to slide with respect to the main body over the hinge assembly.

14 Claims, 4 Drawing Sheets

OTHER PUBLICATIONS

English language translation of abstract of TW 1254199 (published May 1, 2006).
English language translation of abstract of TW M302207 (published Dec. 1, 2006).
English language translation of abstract of TW I278216 (published Apr. 1, 2007).
English language translation of abstract of CN 2372839 (published Apr. 5, 2000).
English language translation of abstract of CN 1291398 (published Apr. 11, 2001).
English language translation of abstract of CN 1988556 (published Jun. 27, 2007).

* cited by examiner

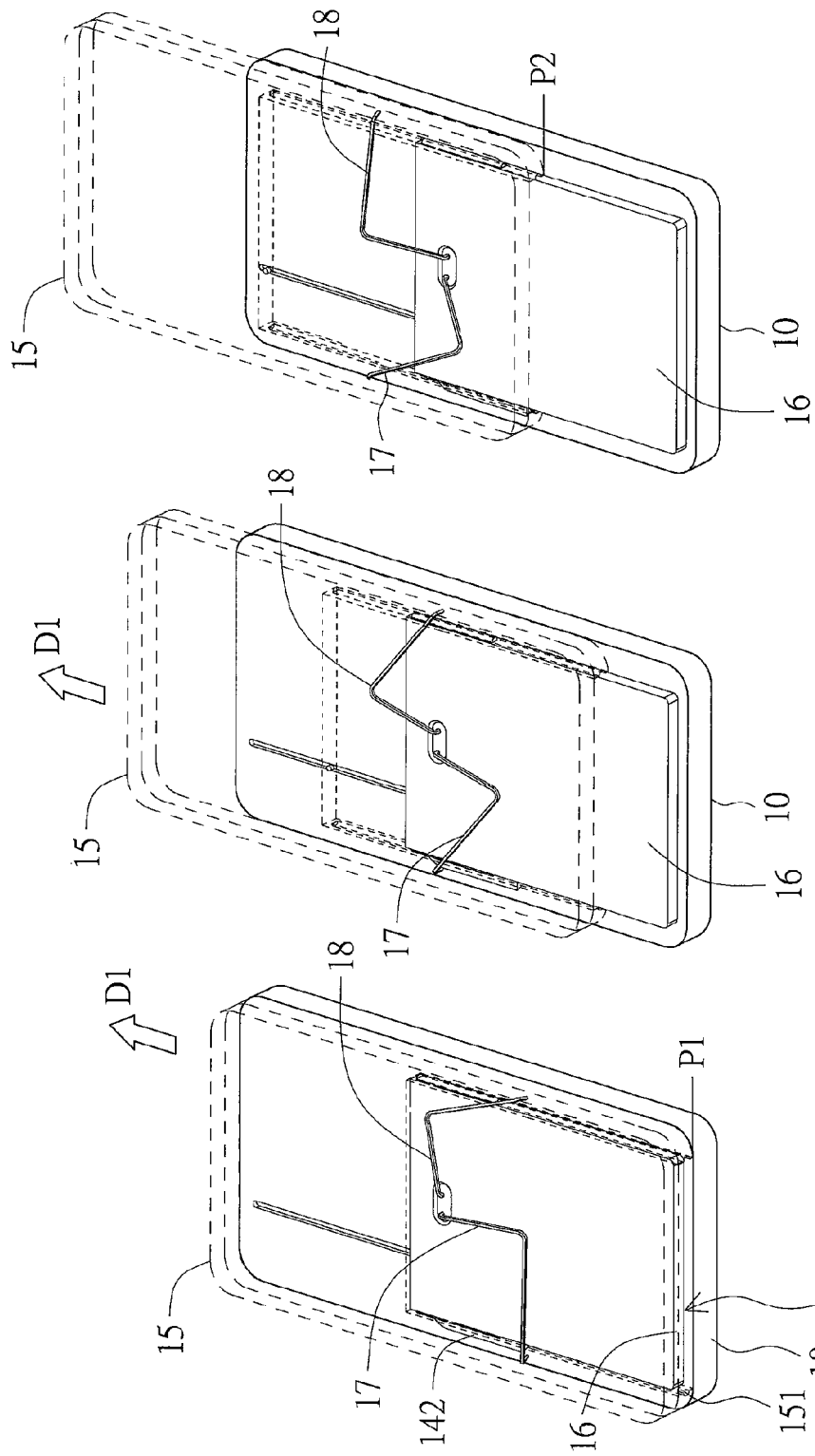

PORTABLE ELECTRONIC DEVICE

This application claims the benefit of Taiwan application Serial No. 96127847, filed Jul. 30, 2007, the subject matter of which is incorporated herein by reference.

BACKGROUND OF THE INVENTION

1. Field of the Invention

Generally, the invention relates to a portable electronic device, and more particularly to a portable electronic device having a main body and a cap body, which is selectively to slide or rotate with respect to the main body.

2. Description of the Related Art

More and more portable electronic devices, such as mobile phones and personal digital assistants (PDAs), have sliding mechanisms. Take, for example, a mobile phone with a sliding function. When a user wants to make a phone call, to input short message texts or to use a specific function of the mobile phone, he or she has to make a cap body of the mobile phone sliding away and then starts to operate the keyboard. The sliding mechanism used in the portable electronic device nowadays has limited operation properties for the user. Usually, a sliding track and a sliding slot are formed on the cap body and a main body of the portable electronic device, respectively, to constitute a sliding hinge. The cap body can slide on the main body to expose or to cover the keyboard of the main body.

Because most portable electronic devices are only equipped with one standard keyboard such as a QWERTY keyboard, also some keys of the keyboard have to serve as both letter keys and digit keys so that the keyboard has the dialing function over the dialing keypad. The keyboard therefore has a messier appearance because some keys have several symbols on their surfaces. Thus, the user has to frequently switch the function of the keyboard, and it causes data-input inconveniently.

At present, another type of portable electronic device that has different symbols, such as digits and letters, disposed on different keyboards, respectively, is available. The portable electronic device has, for example, a standard keyboard and a dialing keypad. Such kind of a design makes the portable electronic device have more than three layers so that the whole device becomes very thick and heavy. Thus, the users would not be interested in it.

SUMMARY OF THE INVENTION

The invention is directed to a portable electronic device having a hinge assembly to enable the cap body of the device to be slidable or to be rotatable with respect to the main body of the device, so as to selectively expose the specific input element, such as keyboard or dialing keypad, to be used by a user.

According to the present invention, a portable electronic device including a main body, a cap body and a hinge assembly is provided. The cap body is movably attached to the main body. The hinge assembly is disposed between the main body and the cap body. The hinge assembly includes a sliding portion and a rotating portion connected to each other. When the cap body and the main body are totally overlapped, the cap body is selectively to rotate or slide with respect to the main body over the hinge assembly.

The invention will become apparent from the following detailed description of the preferred but non-limiting embodiments. The following description is made with reference to the accompanying drawings.

BRIEF DESCRIPTION OF THE DRAWINGS

FIGS. 3A to 3C are diagrams showing that a cap body in FIG. 1A slides with respect to the main body.

DETAILED DESCRIPTION OF THE INVENTION

Figure 1A:
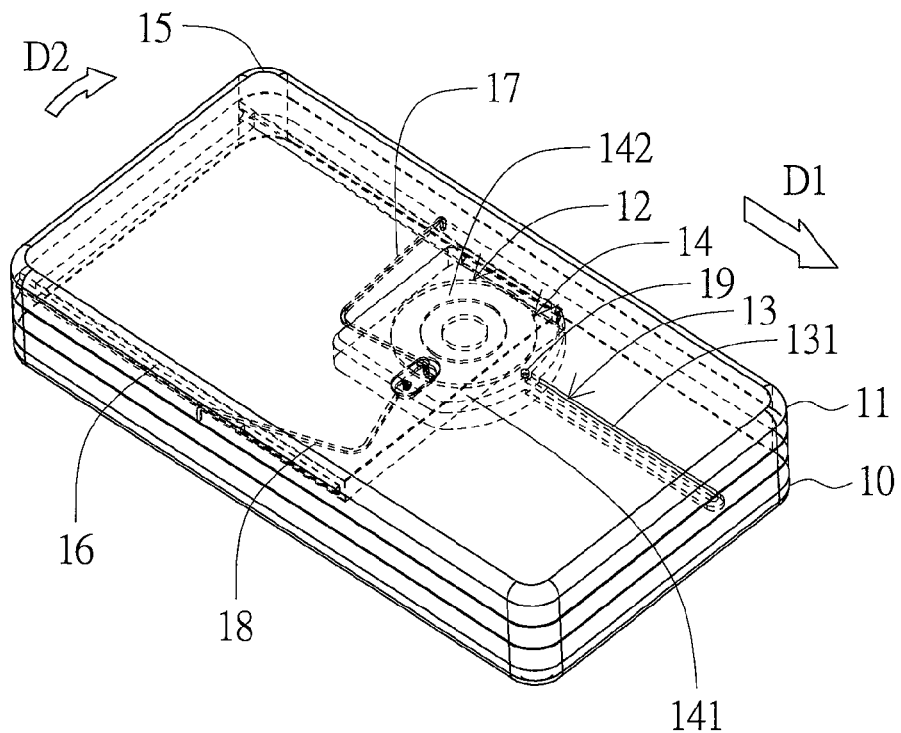
FIG. 1A is a diagram showing a portable electronic device according to a preferred embodiment of the invention.
Figure 1B:
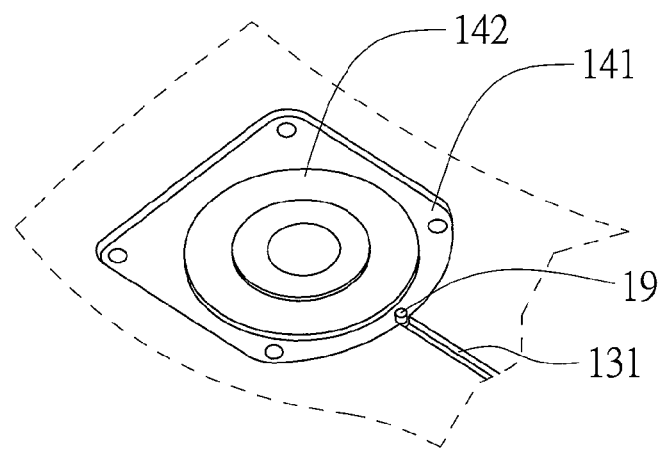
FIG. 1B shows a partially enlarged view of the portable electronic device in FIG. 1A.

Referring to FIG. 1A and FIG. 1B, FIG. 1A is a diagram showing a portable electronic device 1 according to a preferred embodiment of the invention. FIG. 1B shows a partially enlarged view of the portable electronic device 1 in FIG. 1A. The portable electronic device 1 includes a main body 10, a cap body 11 and a hinge assembly 12. The cap body 11 is movably attached to the main body 10. The hinge assembly 12 is disposed between the main body 10 and the cap body 11, and at least includes a sliding portion 13 and a rotating portion 14 connected to each other. When the cap body 11 and the main body 10 are totally overlapped, as shown in FIG. 1A, the cap body 11 is selectively to rotate or slide with respect to the main body 10 over the hinge assembly 12.

The cap body 11 has a first casing 15 and a second casing 16. The second casing 16 is disposed between the first casing 15 and the main body 10, and is coupled to the first casing 15 and the main body 10. The first casing 15 is slidably coupled to the second casing 16, and the second casing 16 is rotatably coupled to the main body 10. The assemblies of the first casing 15 and the second casing 16 are described below.

The portable electronic device 1 further includes at least one elastic member that has two ends connected to the first casing 15 and the second casing 16. The elastic member provides an elastic force to be capable of making the first casing 15 to slide relative to the second casing 16. In this embodiment, two elastic members 17 and 18 are used as an illustration. The elastic members 17 and 18 are, for example, two L-shaped metal wires.

Referring to FIGS. 1A and 1B, the hinge assembly 12 further includes a guiding pin 19 in addition to the sliding portion 13 and the rotating portion 14. This guiding pin 19 is fixed to the bottom surface of the first casing 15 to guide the cap body 11 to move relative to the main body 10. The sliding portion 13 has a straight track 131 disposed on the top surface of the main body 10. The rotating portion 14 has an arc-shaped track 141 disposed on the bottom surface of the second casing 16. The straight track 131 is connected to the arc-shaped track 141, and the guiding pin 19 is used to selectively couple to the straight track 131 or the arc-shaped track 141.

The rotating portion 14 further includes a rotating pivot 142 disposed around the arc-shaped track 141, wherein the rotating pivot 142 is used to connect the second casing 16 to the main body 10. Moreover the arc-shaped track 141 is disposed along an edge of the rotating pivot 142, so that the second casing 16 can rotate with respect to the main body 10 over the rotating pivot 142 when the guiding pin 19 is disposed within the arc-shaped track 141.

When the cap body 11 and the main body 10 are totally overlapped (shown in FIG. 1A), the guiding pin 19 is disposed at the connection portion (see FIG. 1B) between the straight track 131 and the arc-shaped track 141. At this time, the user can apply a force to the first casing 15 driving the guiding pin 19 enter the straight track 131 or the arc-shaped track 141. When the guiding pin 19 is disposed on the straight track 131, the first casing 15 can slide with respect to the second casing 16 and the main body 10, i.e., can slide toward a first direction D1. When the guiding pin 19 is disposed on the arc-shaped track 141, the cap body 11 can rotate with respect to the main body 10, i.e., can rotate in a second direction D2.

Figure 2A:
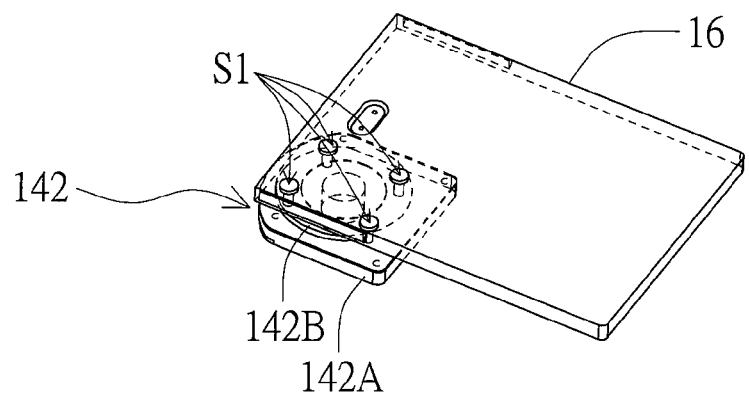
FIG. 2A is a diagram showing a combination of a second casing and a rotating pivot in FIG. 1A.

The second casing 16 and the rotating pivot 142 are assembled in a manner to be described with FIG. 2A, which is a diagram showing a combination of the second casing and the rotating pivot in FIG. 1A. The rotating pivot 142 has a first end 142A and a second end 142B, wherein the first end 142A can rotate with respect to the second end 142B, and the arc-shaped track 141 (shown in FIG. 1B) is disposed between the second casing 16 and the first end 142A. The first end 142A is connected to the top surface (see FIG. 1A) of the main body 10, and the second end 142B is connected to the bottom surface of the second casing 16 so that the second casing 16 can rotate with respect to the main body 10. Preferably, several connecting members S1, such as screws, may be used to attach the second end 142B of the rotating pivot 142 to the second casing 16.

Figure 2B:
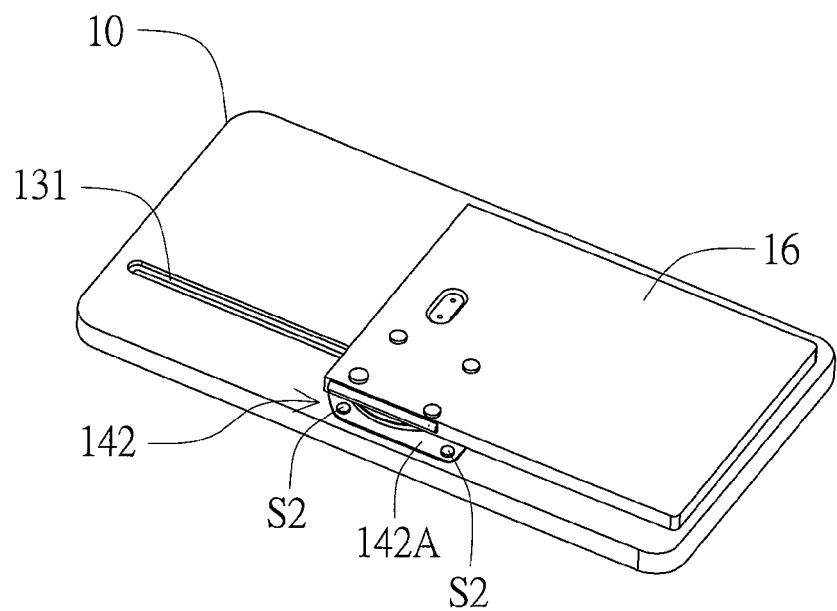
FIG. 2B is a diagram showing a combination of a main body, the second casing and the rotating pivot in FIG. 1A.

The second casing 16, the rotating pivot 142 and the main body 10 are assembled in a manner to be described with FIG. 2B, which is a diagram showing a combination of the main body, the second casing and the rotating pivot in FIG. 1A. Please note that FIG. 2B is a pictorial view obtained when viewed from bottom to top after the main body 10, the second casing 16 and the rotating pivot 142 in FIG. 1A are assembled. Thus, in FIG. 2B, the second casing 16 and the rotating pivot 142 are actually located below the main body 10. Similarly, several connecting members S2, such as screws, may be used to attach the first end 142A of the rotating pivot 142 to the main body 10. After being assembled, the straight track 131 established on the main body 10 is connected to the arc-shaped track 141 (not shown in FIG. 2B), as shown in FIG. 1A.

The relative sliding and rotating movements between the cap body 11 and the main body 10 will be described in the following. It is to be noted that some symbols are omitted for the sake of readability.

FIGS. 3A to 3C are diagrams showing that the cap body in FIG. 1A slides with respect to the main body. As shown in FIG. 3A, the first casing 15 has a spline 151 and an opening 152. The second casing 16 is slidably disposed within the spline 151 and can slide in and out of the spline 151 over the opening 152.

When the user slightly applies the force to the first casing 15 driving the guiding pin 19 enter the straight track 131 (see FIG. 1B), since the guiding pin 19 is restricted by the straight track 131 so that the first casing 15 and the guiding pin 19 can only do the straight-line motion. The second casing 16 is connected to the main body 10 through the rotating pivot 142 and fixed on the main body 10. Therefore, as shown in FIGS. 3A and 3B, the first casing 15 slides toward the first direction D1 with respect to the second casing 16 and the main body 10 to expose the second casing 16.

The portable electronic device 1 is, for example, a communication mobile phone or a PDA. An input element (not shown) such as a dialing keypad or standard keyboard is disposed on the second casing 16 of the portable electronic device 1. When the user wants to operate the dialing keypad, he or she only has to slide the first casing 15 relative to the second casing 16 and the main body 10 to expose the dialing keypad on the second casing 16.

Preferably, the elastic members 17 and 18 are symmetrically disposed between the first casing 15 and the second casing 16. The elastic forces released from the elastic members 17 and 18 are capable of making the first casing 15 automatically slide to a completely closed position P1 (see FIG. 3A) or a completely opened position P2 (see FIG. 3C). When the user starts to slide the first casing 15 from the completely closed position P1 to the completely opened position P2, the first casing 15 and the second casing 16 simultaneously compress the elastic members 17 and 18. After sliding the first casing 15, the balanced position (as the state shown in FIG. 3B) of the elastic force applied to the elastic members 17 and 18 would be reached, then the elastic forces released from the elastic members 17 and 18 could make the first casing 15 automatically slides to the completely opened position P2, and vice versa. When the first casing 15 slides over the balanced position, the first casing 15 can automatically slide back to the completely closed position P1 so that the first casing 15 completely covers the second casing 16. Meanwhile, the guiding pin 19 is back to the connection portion (shown in FIG. 1B) between the straight track 131 and the arc-shaped track 141.

Figure 4B:
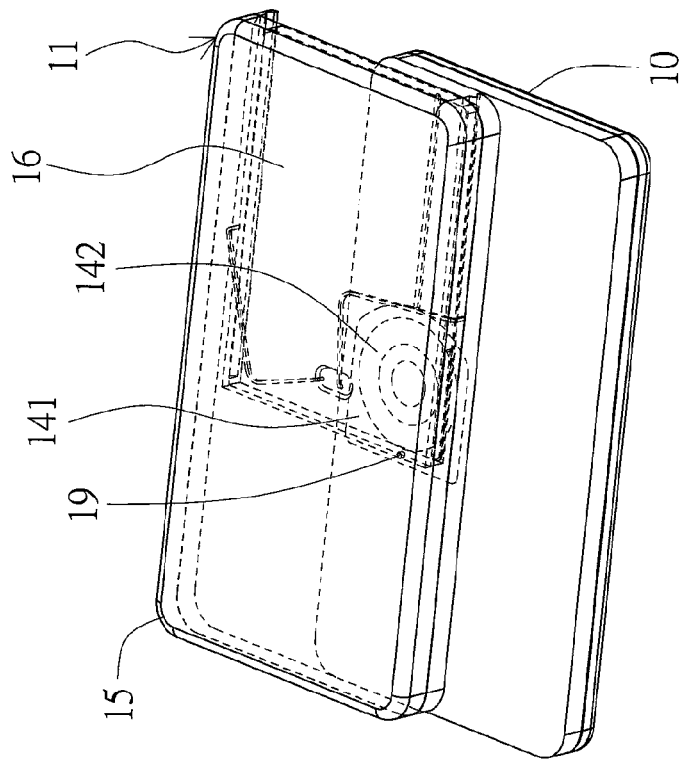
FIGS. 4A and 4B are diagrams showing that the cap body in FIG. 1A rotates with respect to the main body.
Figure 4A:
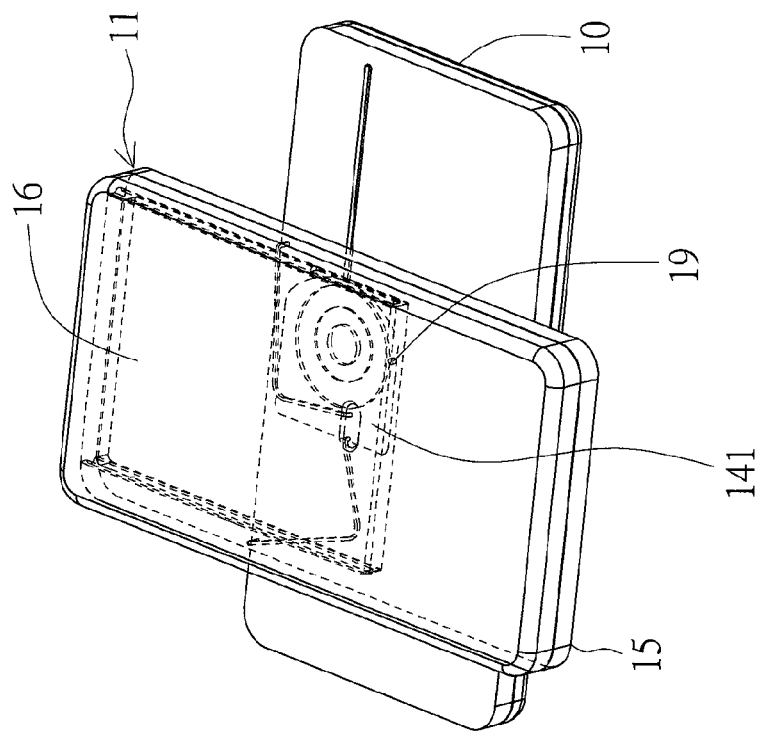

FIGS. 4A and 4B are diagrams showing that the cap body in FIG. 1A rotates with respect to the main body. The user slightly applies the force to the first casing 15, then driving the guiding pin 19 enter the arc-shaped track 141 (see FIG. 1B), since the guiding pin 19 is restricted by the arc-shaped track 141 (shown in FIG. 1B), the first casing 15 cannot slide relative to the second casing 16 so that the first casing 15 and the second casing 16 form an unity. At this time, referring to FIGS. 1A, 4A and 4B, the second casing 16 is pivotally connected to the main body 10, and the guiding pin 19 can slide on the arc-shaped track 141. Therefore, the whole cap body 11 that includes the first and second casings 15 and 16 can rotate in the second direction D2 with respect to the main body 10 over the rotating pivot 142. Preferably, the cap body 11 can rotate by 180 degrees with respect to the main body 10. After the cap body 11 is completely rotated away, as shown in FIG. 4B, a part of the main body 10 is covered by the cap body 11.

Furthermore, an input element (not shown) can be set up on the main body 10 of the portable electronic device 1 and that is disposed between the main body 10 and the cap body 11 when the main body 10 and the cap body 11 are totally overlapped. The input element is, for example, a standard keyboard. After the cap body 11 is rotated by 180 degrees with respect to the main body 10, the standard keyboard is then exposed.

In order to restrict the rotating angle of the cap body 11, another elastic member (not shown) is preferably disposed around the rotating pivot 142 and on the arc-shaped track 141. The elastic member is, for example, a spring. When the cap body 11 and the main body 10 are totally overlapped, the spring is in a totally tensile state. When the cap body 11 starts to rotate, the spring starts to retract so that the cap body 11 automatically rotates relative to the main body 10. In addition, the guiding pin 19 is disposed on the arc-shaped track 141, so that the first casing 15 cannot slide relative to the second casing 16 in the meantime.

The portable electronic device of the embodiment has the advantages partially put forward below.

The portable electronic device provides a selective operation for the user, so that the user can choose to slide or rotate the cap body according to their need when operating the portable electronic device.

And the portable electronic device has higher mobility since different input elements are integrated in the portable electronic device without increasing its size.

Moreover, in the aspect of the convenience, the portable electronic device has different input elements with different functions so that the user can clearly perform the operations without any confusion.

In addition, no redundant element has to be added into the portable electronic device. Only the tracks of the cap body and the main body of the portable electronic device have to be modified. The modified tracks of the cap body and the main body can be integrally formed when the housings of the cap body and the main body are manufactured. The commonly used rotating pivot is employed so that the number of elements remains the same. Thus, the assembling time and the cost are decreased.

According to the portable electronic device of the embodiment of the present invention, the hinge assembly is disposed between the cap body and the main body for attaching the two bodies, also providing the user with better selective operation. The hinge assembly has the rotating pivot, the guiding pin, the straight track and the arc-shaped track. The guiding pin and the straight track cooperate with each other so that the user can slide the first casing away from the second casing of the cap body to use the input element of the second casing, such as the dialing keypad that performs the input operation. Alternatively, the guiding pin, the arc-shaped track and the rotating pivot cooperate with one another so that the user can rotate the cap body relative to the main body and then inputting data through the input element, such as the standard keyboard. Since the operation is convenient and the manufacturing cost is low, the portable electronic device would be a best-buy and with higher competitiveness.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A portable electronic device, comprising:
   a main body;
   a cap body movably attached to the main body, the cap body comprises a first casing and a second casing coupled to each other, the first casing is slidably coupled to the second casing, and the second casing is rotatably coupled to the main body; and
   a hinge assembly disposed between the main body and the cap body, at least including a sliding portion and a rotating portion connected to each other, the hinge assembly further comprises a rotating pivot and a guiding pin apart from a center of the rotating pivot, the rotating pivot is connected to the second casing and the main body, and the guiding pin is fixed to a bottom surface of the first casing;
   the sliding portion has a straight track disposed on a top surface of the main body, the rotating portion has an arc-shaped track, the arc-shaped track is disposed on an edge of the rotating pivot and on a bottom surface of the second casing;
   when the cap body and the main body are totally overlapped, the guiding pin is located at a connection portion between the straight track and the arc-shaped track;
   when the guiding pin is moved to the straight track, the first casing is slidable with respect to the second casing and the main body; and
   when the guiding pin is moved to the arc-shaped track, the cap body is rotatable with respect to the main body.

2. The portable electronic device according to claim 1, wherein the second casing is disposed between the first casing and the main body.

3. The portable electronic device according to claim 1, wherein the first casing comprises a spline and an opening, the second casing is slidably disposed within the spline and slides in and out of the spline over the opening.

4. The portable electronic device according to claim 1, wherein the rotating pivot has a first end and a second end, the first end is rotatable with respect to the second end, the first end is connected to the top surface of the main body, and the second end is connected to the bottom surface of the second casing.

5. The portable electronic device according to claim 1, further comprising:
   an elastic member disposed adjacent to the rotating pivot and the arc-shaped track, wherein an elastic force of the elastic member makes the cap body rotate automatically.

6. The portable electronic device according to claim 1, further comprising:
   at least one elastic member having two ends respectively connected to the first casing and the second casing, wherein an elastic force of the elastic member makes the first casing automatically slide to a completely opened position or to a completely closed position.

7. The portable electronic device according to claim 1, further comprising:
   an input element disposed on a top surface of the main body, wherein the input element is exposed when the cap body rotates with respect to the main body.

8. The portable electronic device according to claim 7, wherein the input element is a standard keyboard.

9. The portable electronic device according to claim 1, further comprising:
   an input element disposed on a top surface of the second casing, wherein the input element is exposed when the first casing slides with respect to the second casing and the main body.

10. The portable electronic device according to claim 9, wherein the input element is a dialing keypad.

11. A portable electronic device, comprising:
    a main body;
    a cap body movably attached to the main body, the cap body comprises a first casing and a second casing coupled to each other, and the second casing is coupled to the main body;
    a hinge assembly disposed between the main body and the cap body, including a straight track and an arc-shaped track, the straight track being connected to the arc-shaped track; and
    a guiding pin disposed apart from a center of the hinge assembly, wherein the guiding pin is fixed to a bottom surface of the first casing, the straight track is disposed on a top surface of the main body, the arc-shaped track is disposed around the center of the hinge assembly and on a bottom surface of the second casing;
    when the cap body and the main body are totally overlapped, the guiding pin is located at a connection portion between the straight track and the arc-shaped track;
    when the guiding pin is moved to the straight track, the cap body is slidable with respect to the main body; and when the guiding pin is moved to the arc-shaped track, the cap body is rotatable around the center of the hinge assembly with respect to the main body.

12. The portable electronic device according to claim 11, wherein the second casing is disposed between the first casing and the main body.

13. The portable electronic device according to claim 11, wherein the first casing is slidably coupled to the second casing, and the second casing is rotatably coupled to the main body.

14. The portable electronic device according to claim 11, wherein the first casing comprises a spline and an opening, the second casing is slidably disposed within the spline and slides in and out of the spline over the opening.

* * * * *